United States Patent
Hatayama et al.

(10) Patent No.: US 9,833,848 B2
(45) Date of Patent: Dec. 5, 2017

(54) CONNECTING-ROD FRACTURE SPLITTING APPARATUS

(71) Applicant: HONDA MOTOR CO., LTD., Tokyo (JP)

(72) Inventors: Tadatomo Hatayama, Tochigi (JP); Tomohiro Nakajima, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 23 days.

(21) Appl. No.: 15/045,736

(22) Filed: Feb. 17, 2016

(65) Prior Publication Data

US 2016/0265581 A1    Sep. 15, 2016

(30) Foreign Application Priority Data

Mar. 12, 2015 (JP) ................. 2015-049229

(51) Int. Cl.
*B23D 31/00* (2006.01)
*F16C 9/04* (2006.01)

(52) U.S. Cl.
CPC .............. *B23D 31/003* (2013.01); *F16C 9/04* (2013.01); *F16C 2220/80* (2013.01)

(58) Field of Classification Search
CPC ....... B23D 31/002; B23D 31/003; F16C 9/45; F16C 2220/80; F16C 9/04; Y10T 225/35; Y10T 225/386

See application file for complete search history.

(56) References Cited

U.S. PATENT DOCUMENTS

| | | | | |
|---|---|---|---|---|
| 4,754,906 A | * | 7/1988 | Brovold | B23D 31/003 225/103 |
| 8,302,271 B2 | * | 11/2012 | Hashimoto | B23D 31/003 225/104 |
| 2005/0011925 A1 | * | 1/2005 | Momose | B23D 31/003 225/1 |
| 2005/0044706 A1 | * | 3/2005 | Momose | B23D 31/003 29/888.09 |
| 2010/0018023 A1 | | 1/2010 | Hashimoto | |

FOREIGN PATENT DOCUMENTS

| | | | | |
|---|---|---|---|---|
| DE | EP 0467198 A1 | * | 1/1992 | ........... B23D 31/003 |
| DE | CA 2387586 A1 | * | 4/2001 | ............. B22F 5/003 |
| JP | 11-070423 | | 3/1999 | |
| JP | 3642268 | | 2/2005 | |
| JP | 2008-144925 | | 6/2008 | |

* cited by examiner

*Primary Examiner* — Jennifer Swinney
(74) *Attorney, Agent, or Firm* — Rankin, Hill & Clark LLP

(57) ABSTRACT

Actuator of a connecting-rod fracture splitting apparatus includes: a piston rod having one end portion extending through a lid of the cylinder and connected to a wedge; and a free piston slidably mounted on the piston rod and abuttable against the upper surface of the piston. By pressure fluid being supplied to act on the upper surface of the piston, the free piston imparts a preload to a hole of a big end section of the connecting rod. By pressure fluid being supplied to act on a region upward of the free piston, the free piston is driven downward to collide against the upper surface of the piston, so that divided mandrel members are moved apart from each other, via the piston rod and the wedge, to fracture a large end section of the connecting rod.

3 Claims, 6 Drawing Sheets

US 9,833,848 B2

CONNECTING-ROD FRACTURE SPLITTING APPARATUS

FIELD OF THE INVENTION

The present invention relates generally to connecting-rod fracture splitting apparatus which split, by a fracture method, a large end section of a connecting rod (hereinafter referred to as "conrod") to be mounted in an internal combustion engine

BACKGROUND OF THE INVENTION

As well known, the connecting rod or conrod (preform or blank) has a large end section constructed as a splittable structure intended for mounting to a crankshaft. Among various methods for constructing a conrod as such a splittable structure is a fracture-based slitting method. Various connecting-rod fracture splitting apparatus employing the fracture-based slitting method have heretofore been proposed, one example of which is disclosed in Japanese Patent No. 3642268 ((hereinafter referred to as "Patent Literature 1"). More specifically, Patent Literature 1 discloses an apparatus which expands a mandrel unit by inserting thereinto a wedge connected to a hydraulic actuator, and in which a pressure accumulator is provided in a hydraulic circuit.

As shown by the vertical axis of FIG. 6 in Patent Literature 1, the connecting-rod fracture splitting apparatus is characterized by controlling a load to be applied to the large end section stepwise to a preload load and to a fracture load. With the pressure accumulator provided in the hydraulic circuit of the apparatus, high-pressure hydraulic oil can be supplied quickly or instantaneously, so that the fracture load can be applied instantaneously.

Further, as shown by the horizontal axis of FIG. 6 in Patent Literature 1, the hydraulic actuator requires a considerable rise time because it starts operating from a rest state. Therefore, a considerable time is required before the fracturing starts, which would create an undesirable stretch in the large end section and an undesirable time difference between a left fractured portion and a right fractured portion. As a result, roughness and cracks of the fractured surface can occur, resulting in low quality of the conrod.

As a measure against the aforementioned prior art inconveniences, there has been proposed an apparatus which employs a collision method such that it can perform quick fracturing by causing collision of a mass body, as disclosed in Japanese Patent No. 2695272 (hereinafter referred to as "Patent Literature 2"). According to the disclosure of Patent Literature 2, the inconveniences of the apparatus disclosed in Patent Literature 1 can be overcome because the collision method can apply the fracture load more quickly than the hydraulic actuator. However, the apparatus disclosed in Patent Literature 2 would undesirably introduce deterioration of working environment due to large sound produced by the collision (i.e., collision sound). Thus, in recent years, there have been great demands for improvement of the working environment.

SUMMARY OF THE INVENTION

In view of the foregoing prior art problems, it is an object of the present invention to provide an improved connecting-rod fracture splitting apparatus which can perform high-quality fracturing of the connecting rod while maintaining good working environment.

In order to accomplish the above-mentioned object, the present invention provides an improved connecting-rod fracture splitting apparatus which includes two divided mandrel members for being inserted into a hole of a large end section of a connecting rod, a wedge for being driven into between the divided mandrel members, and an actuator for advancing the wedge to move the divided mandrel members away from each other, and which splits the connecting rod by fracturing the large end section of the connecting rod, the actuator comprising: a bottomed cylinder having a piston accommodated therein; a piston rod having one end portion extending through a lid, closing an opening of the cylinder, to outside of the cylinder and connected directly or indirectly to the wedge; and a free piston slidably mounted on the piston rod and abuttable against the upper surface of the piston. By pressure fluid being supplied into the actuator so as to act on the upper surface of the piston, the free piston is positioned upward of the piston while imparting a preload to the hole of the large end section. Further, by pressure fluid being supplied into the actuator to act on a region upward of the free piston, the free piston is driven downward to collide against the upper surface of the piston, so that the divided mandrel members are moved apart from each other, via the piston rod and the wedge, to fracture the large end section of the connecting rod.

In the present invention, the large end section of the conrod is fractured and split by driving the free piston to collide against the piston as above. Because the impact force of the collision can cause the mandrel members to instantaneously move apart from each other, the large end section can have a good-quality fractured surface. Further, because the colliding action of the free piston occurs within the cylinder, sound produced by the collision, i.e. collision sound, can be effectively blocked by the cylinder, and thus, it is possible to prevent the collision sound from deteriorating the working environment.

Preferably, in the connecting-rod fracture splitting apparatus of the invention, the free piston includes a flange portion which has an outer peripheral surface slidingly contacting a peripheral edge surface of a hole of a partition wall and an inner peripheral surface slidingly contacting the piston rod, the partition wall being fixed to the cylinder between the piston and the lid, the hole of the partition wall being greater in diameter than the piston rod. The actuator further has: a first port provided in the bottom of the cylinder; a second port provided in a wall portion of the cylinder between the partition wall and the bottom; a third port provided in the wall portion of the cylinder between the partition wall and the lid; and a fourth port provided in the lid to extend toward the flange portion of the free piston; and a control section. The control section performs a step of suppling pressure fluid into the actuator through the fourth port and thereby driving the free piston to collide against the piston. Here, compressed air may be used as the pressure fluid. If the working medium is only the compressed air, no oil leakage would occur, so that the working environment can be maintained in good condition. As a result, the connecting-rod fracture splitting apparatus can perform high-quality fracturing of the connecting rod while effectively maintaining good working environment.

Further, preferably, in the connecting-rod fracture splitting apparatus of the invention, the free piston has an outer peripheral surface slidingly contacting the cylinder and has an inner peripheral surface slidingly contacting the piston rod, the actuator further has: an A port provided in a bottom of the cylinder; a B port provided in a wall portion of the cylinder between the piston and the free piston; a C port provided in the lid; and a control section, and the control section performs a step of supplying pressure fluid into the actuator through the C port and thereby driving the free piston to collide against the piston. Because only the three ports, i.e. A to C ports, suffice in this preferred implementation, the port-related structure can be simplified, with the result that the connecting-rod fracture splitting apparatus can be significantly simplified in construction.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

Figure 1:
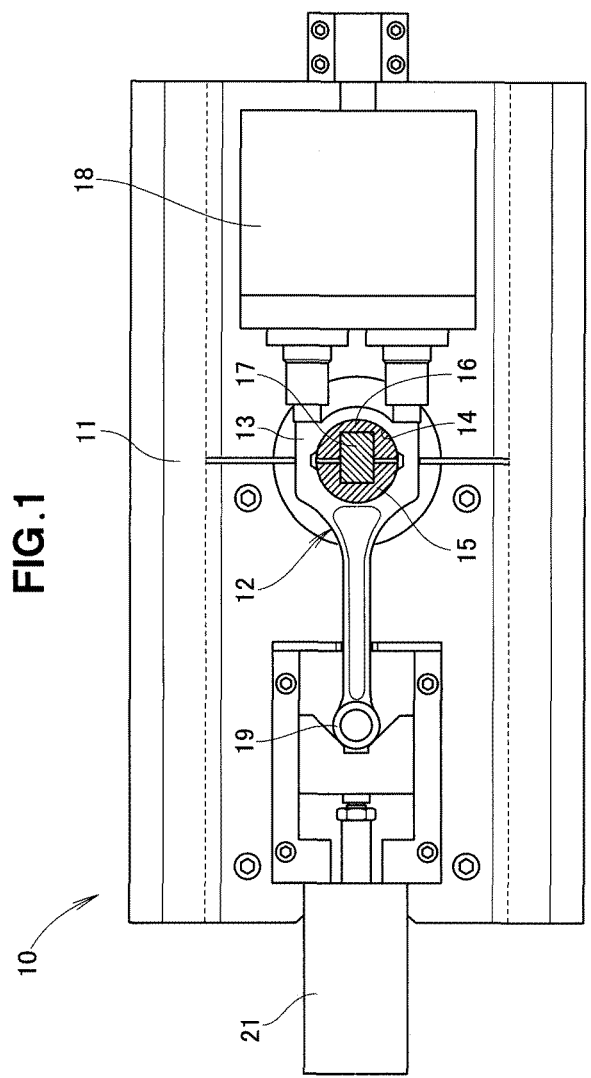
FIG. 1 is a top plan view of a preferred embodiment of a connecting-rod fracture splitting apparatus of the present invention.

As shown in a top plan view of FIG. 1, a preferred embodiment of a connecting-rod fracture splitting apparatus 10 of the present invention includes: a machine table 11; a mandrel unit comprising two divided mandrel members 15 and 16 (fixed mandrel 15 and movable mandrel 16) for being inserted into a hole 14 formed in a large end section 13 of a conrod 12; a wedge 17 for being driven into between the two divided mandrel members 15 and 16; a large-end-section clamp mechanism 18 for clamping the large end section 13 of the conrod 12 and a small-end-section clamp mechanism 21 for clamping a small end section 19 of the conrod 12.

Figure 2:
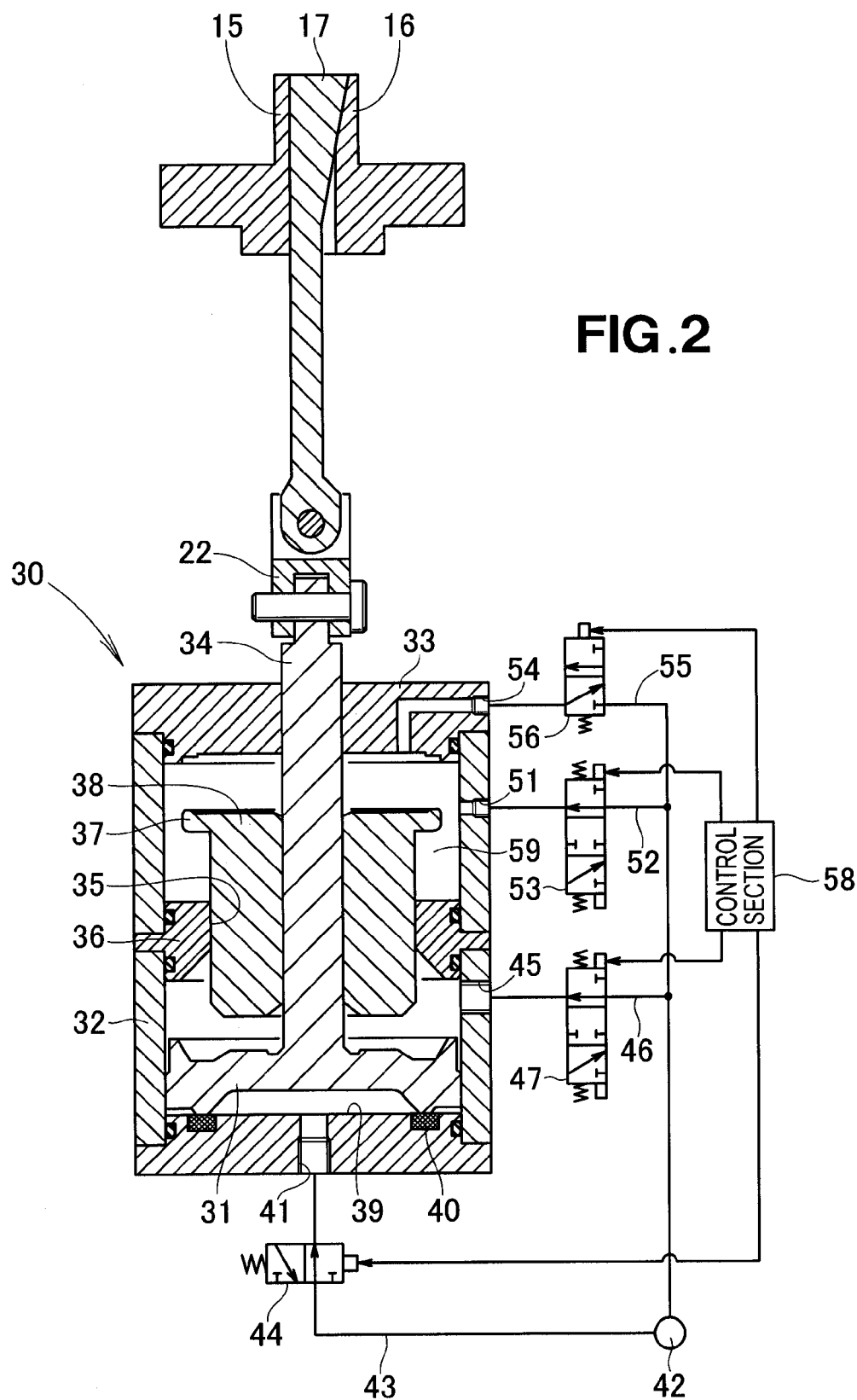
FIG. 2 is a sectional view of principal sections of the preferred embodiment of the connecting-rod fracture splitting apparatus of the present invention.

As shown in FIG. 2, the wedge 17 is mechanically connected to an actuator 30 via a connection member 22. The actuator 30 includes: a bottomed cylinder 32 having a piston 31 accommodated therein; a lid 33 closing an opening of the cylinder 32; a piston rod 34 having one end portion extending out of the cylinder 32 through the lid 33 and connected to the wedge 17; a partition wall 36 fixed to the cylinder 32 between the piston 31 and the lid 33 and having a hole 35 greater in diameter than the piston rod 34; and a free piston 38 slidably mounted on the piston rod 34 and abuttable against the upper surface of the piston 31. The free piston 38 has an outer peripheral surface slidingly contacting the peripheral edge surface of the large-diameter hole 35 (i.e., slidingly contacting the inner peripheral surface of the cylinder 32 via the partition wall 36) and has an inner peripheral surface slidingly contacting the piston rod 34.

The free piston 38 has a flange portion 37 formed on its one end portion adjacent to the lid 33 for abutting against the lid 33. The cylinder 32 has a shock absorbing member 40 provided on a portion of a bottom 39 thereof corresponding to the piston 31.

The actuator 30 further includes: a first port 41 provided in the bottom 39 of the cylinder 32; a first control valve 44 provided in an air passage 43 interconnecting the first port 41 and a compressed air source 42; a second port 45 provided in a wall portion of the cylinder 32 between the partition wall 36 and the bottom 39; a second control valve 47 provided in an air passage 46 interconnecting the second port 45 and the compressed air source 42; a third port 51 provided in a wall portion of the cylinder 32 between the partition wall 36 and the lid 33; a third control valve 53 provided in an air passage 52 interconnecting the third port 51 and the compressed air source 42; a fourth port 54 provided in the lid 33 to extend toward the flange portion 37; a fourth control valve 56 provided in an air passage 55 interconnecting the fourth port 54 and the compressed air source 42; and a control section 58 that controls the first to fourth control valves 44, 47, 53 and 56.

The first control valve 44 is a valve for switching between supplying the compressed air of the compressed air source 42 to the first port 41 and shutting down the compressed air supply to open the first port 41 to the atmosphere.

The second control valve 47 is a valve for switching among supplying the compressed air to the second port 45, shutting down the compressed air supply to the second port 45 to open the second port 45 to the atmosphere and closing the second port 45.

The third control valve 53 is, like the second control valve 47, a valve for switching among supplying the compressed air to the third port 51, shutting down the compressed air supply to the third port 51 to open the third port 51 to the atmosphere and closing the third port 51.

The fourth control valve 56 is, like the first control valve 44, a valve for switching between supplying the compressed air of the compressed air source 42 to the fourth port 54 and shutting down the compressed air supply to the fourth port 54 to open the fourth port 54 to the atmosphere.

Figure 3:
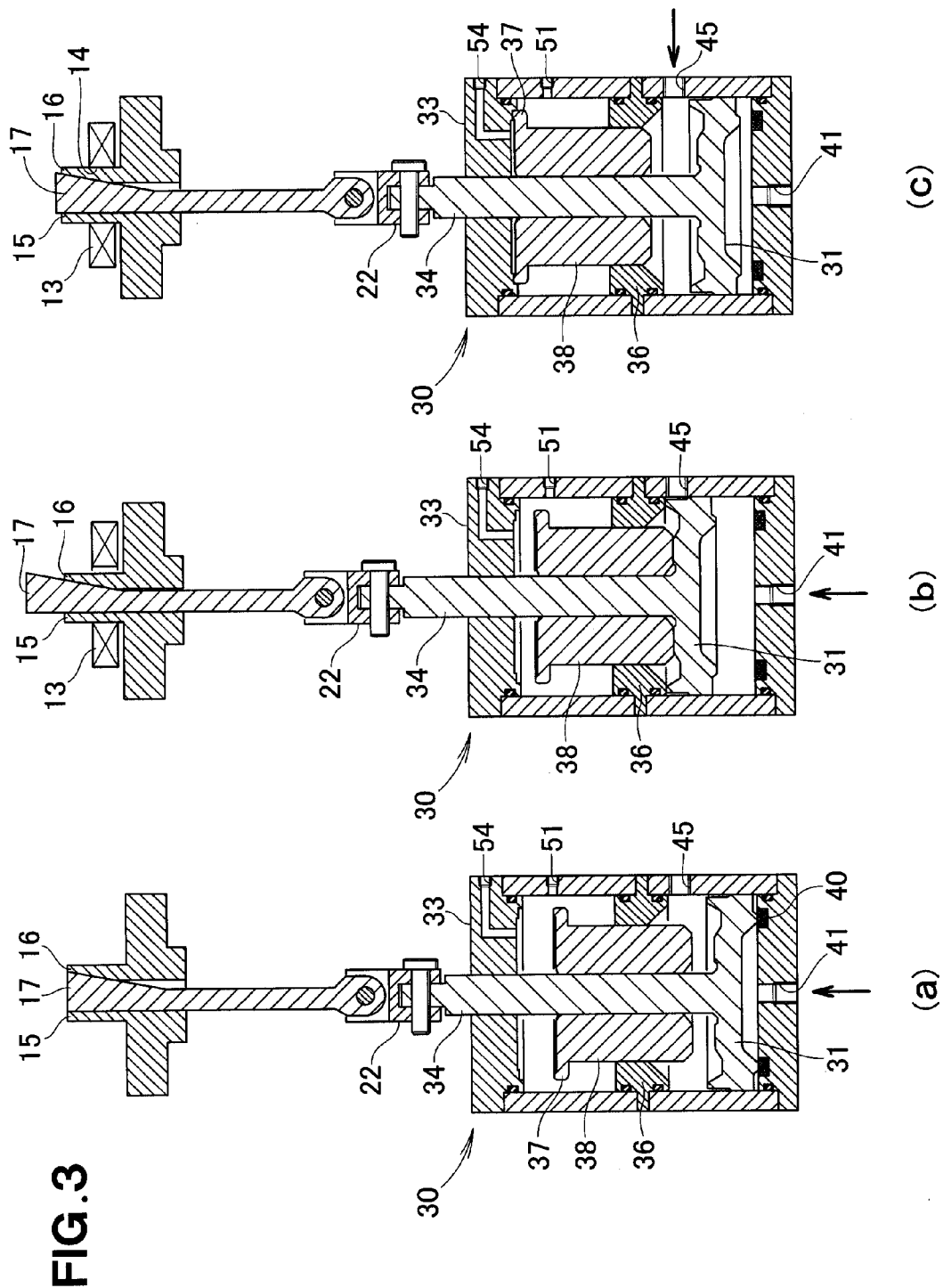
FIG. 3 is a view explanatory of operation of the preferred embodiment of the connecting-rod fracture splitting apparatus.
Figure 4:
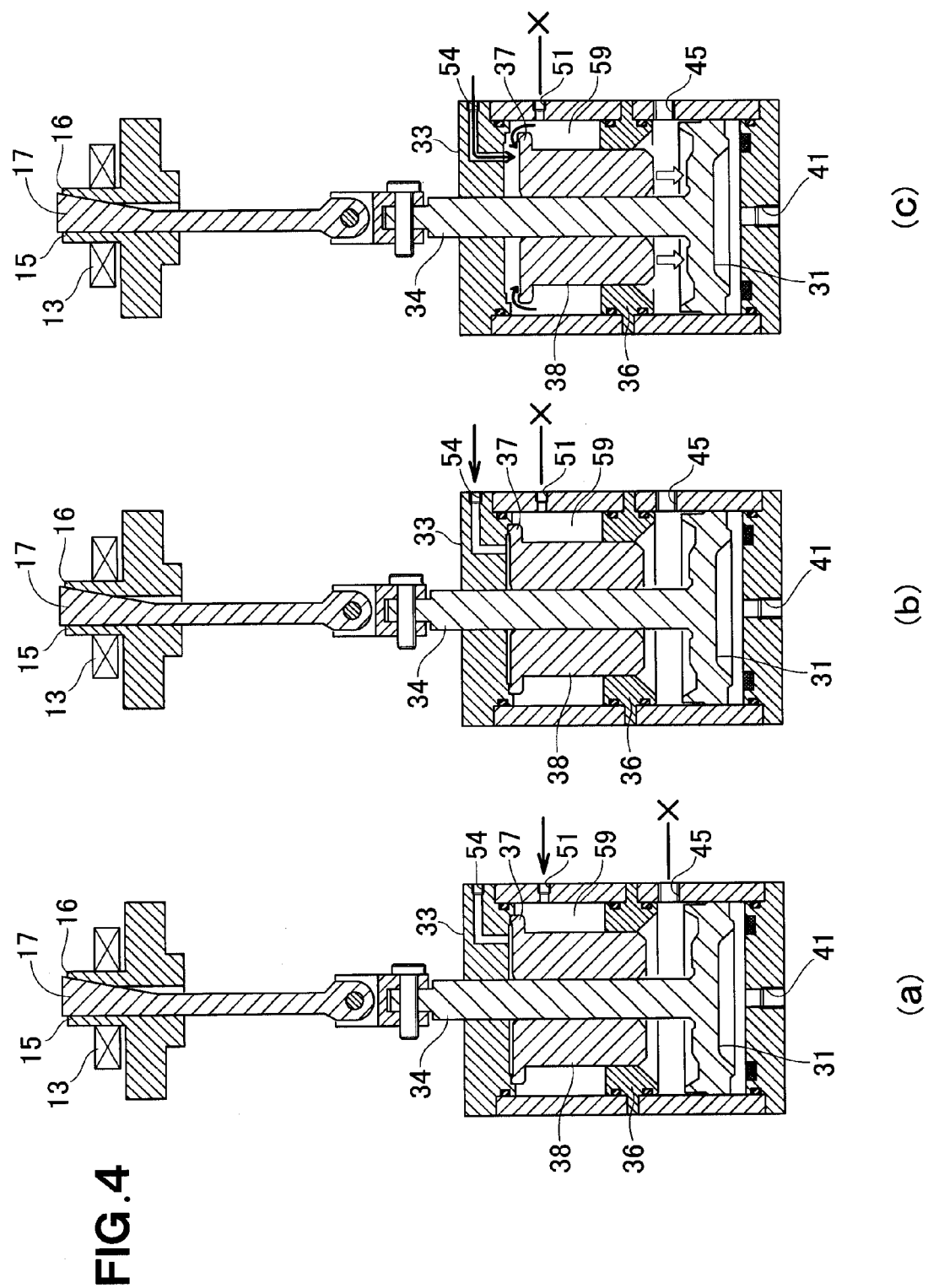
FIG. 4 is a view explanatory of the operation of the preferred embodiment of the connecting-rod fracture splitting apparatus.

The following describe, with reference to FIGS. 3 and 4, operation of the connecting-rod fracture splitting apparatus 10 constructed in the aforementioned manner. First, as shown in FIG. 3(a), the compressed air is supplied into the actuator through the first port 41 with the second to fourth ports 45, 51 and 54 opened to the atmosphere. Thus, as shown in FIG. 3(b), the piston 31 and the piston rod 34 move upward, which causes the wedge 17 to move upward. As a consequence, the divided mandrel members 15 and 16 move toward each other. In this state, the large end section 13 can be set around the mandrel members 15 and 16 (first step).

Then, as shown in FIG. 3(c), the compressed air is supplied into the actuator through the second port 45 with the first, third and fourth ports 41, 51 and 54 opened to the atmosphere. Thus, the free piston 38 moves upward (ascends) to abut against the lid 33, and simultaneously, the piston 31 too moves downward (descends). As the piston 31 moves downward like this, the wedge 17 moves downward to cause the mandrel members 15 and 16 to move away from each other, so that the mandrel members 15 and 16 are brought into abutting contact with the peripheral edge surface of the hole 14 of the large end section 13 and thus the actuator is placed in a preload state (second step).

Then, as shown in FIG. 4(*a*), the second port 45 is closed with the first and fourth ports 41 and 54 opened to the atmosphere, and the compressed air is supplied into the actuator through the third port 51 (third step). By such a third step, the compressed air is accumulated in a chamber 59 between the partition wall 36 and the lid 33, so that the actuator is placed in a pressure-accumulated state.

Then, as shown in FIG. 4(*b*), the third port 51 is closed with the first and second ports 41 and 45 opened to the atmosphere, and the compressed air is supplied into the actuator through the fourth port 54. Because an area (pressure-receiving area) of the upper surface of the flange portion 37 is much greater than that of the lower surface of the flange portion 37, the free piston 38 starts moving downward on the basis of a difference between the two pressure-receiving areas.

Then, as shown in FIG. 4(*c*), a large amount of the high-pressure compressed air, having been accumulated in the chamber 59, travels around to the upper surface of the flange portion 37 to downwardly urge the flange portion 37 and hence the free piston 38. Thus, the free piston 38 is pushed downward at high speed as indicated by white arrows by thrust force of a value equal to a product between the area of the upper surface of the flange portion 37 and a pressure difference between the pressure of the compressed air and the atmospheric pressure, so that the free piston 38 collides against the piston 31 at high speed. Thus, the impact force of the collision drives the wedge 17 downward instantaneously, so that the mandrel members 15 and 16 instantaneously move apart from each other, i.e. the mandrel unit expands instantaneously. By such expansion of the mandrel unit, the large end section 13 is fractured and split (fourth step).

As described above, the control section 58 performs:

the first step of supplying the compressed air into the actuator 30 through the first port 41 with the second to fourth ports 45, 51 and 54 placed in the opened state to thereby move the divided mandrel members 15 and 16 toward each other so that the large end section can be set around the divided mandrel members 15 and 16;

the second step of supplying the compressed air into the actuator 30 through the second port 45 with the first, third and fourth ports 41, 51 and 54 placed in the opened state to thereby move the free piston 38 until the free piston 38 abuts against the lid 33 and also move the piston 31, so that the wedge 17 is driven to cause the mandrel members 15 and 15 to move away from each other into abutting contact with the peripheral edge surface of the hole 14 of the large end section 13;

the third step of supplying the compressed air into the actuator 30 and accumulating the compressed air with the first and fourth ports 41 and 54 placed in the opened state and the second port 45 placed in the closed state; and the fourth step of supplying the compressed air into the actuator 30 through the fourth port 54 with the first and second ports 41 and 45 placed in the opened state and the third port 51 in the closed state and thereby driving the free piston 38 to collide against the piston 31.

By driving the free piston 38 to collide against the piston 31 as above, the large end section 13 of the conrod 12 is fractured and split. Because the impact energy of the collision can be imparted instantaneously to a fracturing part of the large end section 13, the large end section 13 can have a good-quality fractured surface. Further, because the free piston 38 and the piston 31 are accommodated in the bottomed cylinder 32, collision sound produced by the collision of the free piston 38 against the piston 31 can be effectively blocked by the bottomed cylinder 32, and thus, it is possible to prevent the collision sound from deteriorating the working environment. In addition, because the working medium used in the apparatus is only the compressed air, no unwanted oil leakage occurs, so that the working environment can be maintained in good condition.

Figure 5:
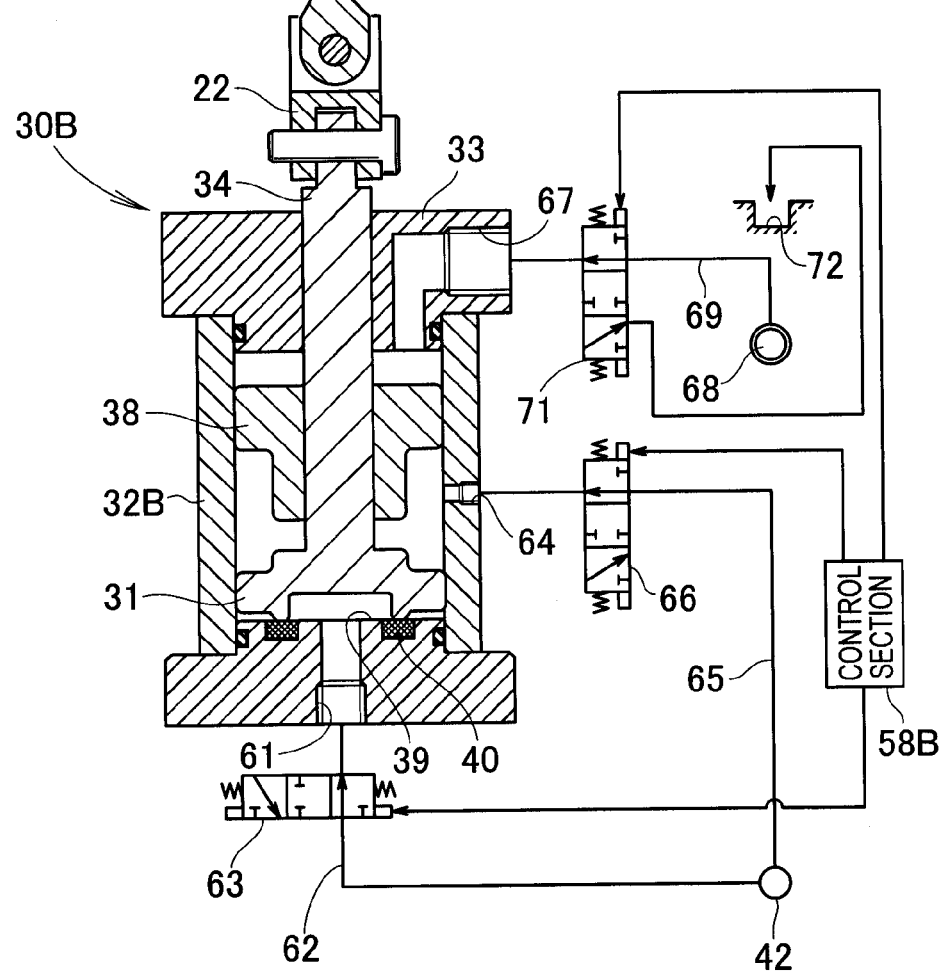
FIG. 5 is a sectional view explanatory of a modification of the connecting-rod fracture splitting apparatus.
Figure 6:
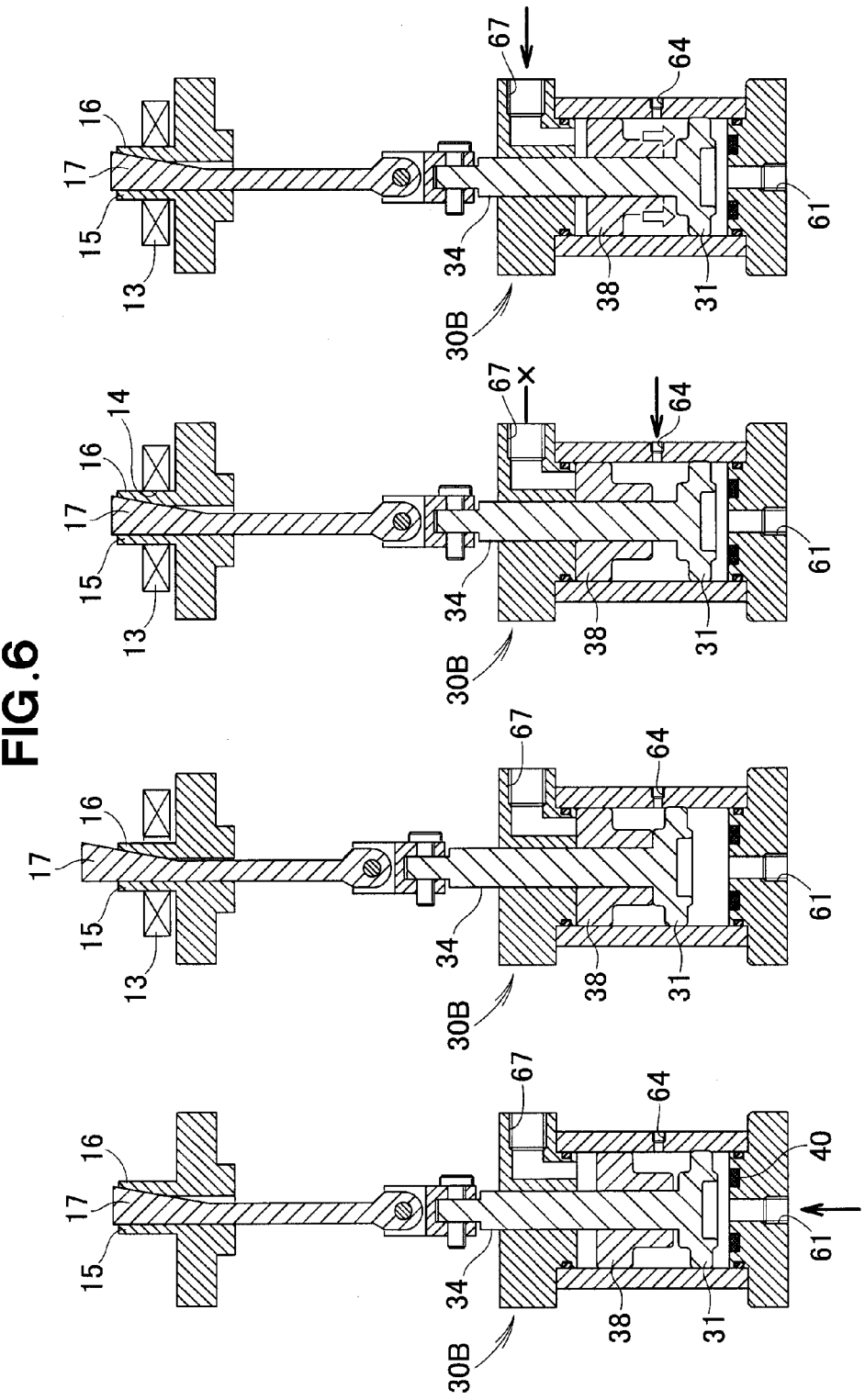
FIG. 6 is a view explanatory of operation of the modification.

The following describe a modification of the connecting-rod fracture splitting apparatus of the invention with reference to FIGS. 5 and 6. In the modification, as shown in FIG. 5, an actuator 30B, corresponding to the actuator 30 in the above-described embodiment, includes: a bottomed cylinder 32B having the piston 31 accommodated therein; the piston rod 34 extending through the lid 33, closing the opening of the cylinder 30B, out of the cylinder 30B and connected directly or indirectly to the wedge 17; and the free piston 38 having an outer peripheral surface slidingly contacting the cylinder 32B and having an inner peripheral surface slidingly contacting the piston rod 34.

The actuator 30B further includes; an A port 61 provided in the bottom 39 of the cylinder 32B; an A control valve 63 provided in an air passage 62 interconnecting the A port 61 and the compressed air source 42; a B port 64 provided in a wall portion of the cylinder 32B between the piston 31 and the free piston 38; a B control valve 66 provided in an air passage 65 interconnecting the B port 64 and the compressed air source 42; a C port 67 provided in the lid 33; a C control valve 71 provided in an oil passage 69 interconnecting the C port 67 and an oil pressure source 68; and a control section 58B that controls the A to C control valves 63, 66 and 71.

The A control valve 63 is a valve for switching among supplying the compressed air of the compressed air source 42 to the A port 61, closing the A port 61 and opening the A port 61 to the atmosphere.

The B control valve 66 is a valve for switching among supplying the compressed air of the compressed air source 42 to the B port 64, shutting down the compressed air supply to the B port 64 to open the B port 64 to the atmosphere and closing the B port 64.

The C control valve 71 is a valve for switching among supplying compressed oil of the oil pressure source 68 to the C port 67, closing the C port 67 and opening the C port 67 to a drain 72.

The following describe operation of the actuator 30B constructed in the aforementioned manner. First, as shown in FIG. 6(*a*), the compressed air is supplied into the actuator through the A port 61 with the B and C ports 64 and 67 opened to the atmosphere (i.e., placed in the opened state). Thus, the piston 31, the piston rod 34 and the wedge 17 move upward, and the free piston 38 too moves upward until it abuts against the lid 33. As a consequence, the divided mandrel members 15 and 16 move toward each other, so that the large end section 13 can be set around the mandrel members 15 and 16 (A step).

Then, the C port 67 is closed as shown in FIG. 6(*c*), so that the movement of the free piston 38 is restricted. Simultaneously, the compressed air is supplied into the actuator 30B through the B port 64 with the A port 61 placed in the opened state. Thus, the piston 31 moves until the mandrel members 15 and 16 are brought into abutting contact with the peripheral edge surface of the hole 14 with the free piston 38 left unmoved. As a consequence, the wedge 17 is moved to cause the mandrel members 15 and 16 to be brought into abutting contact with the peripheral edge surface of the hole 14, so that a preload state can be obtained (B step).

Then, as shown in FIG. 6(d), accumulated pressurized oil is supplied into the actuator 30B at high speed through the C port 67 with the A and B ports 61 and 64 placed in the opened state, to thereby drive the free piston 38 to collide against the piston 31 (C step). Thus, the large end section 13 of the conrod is split by the impact force of the collision.

As described above, the control section 58B performs:

the A step of supplying the compressed air into the actuator 30B through the A port 61 with the B and C ports 64 and 67 placed in the opened state, to thereby move the free piston 38 until the free piston 38 abuts against the lid 33 and move the divided mandrel members 15 and 16 toward each other so that the large end section 13 can be set around the divided mandrel members 15 and 16;

the B step of supplying the compressed air into the actuator 30B through the B port 64 with the A port 61 placed in the opened state and the C port 67 placed in the closed state, to thereby move the piston 31 and the wedge 17 so that the mandrel members 15 and 16 are moved away from each other into abutting contact with the peripheral edge surface of the hole 14; and the C step of supplying the pressurized oil into the actuator 30B through the C port 67 with the A and B ports 61 and 64 placed in the opened state, to thereby drive the free piston 38 to collide against the piston 31. Note that another step of closing the B port 64 and maintaining the preload may be added between the A step and the B step.

By driving the free piston 38 to collide against the piston 31 as above, the large end section 13 of the conrod 12 is fractured and split. Because the impact energy of the collision can be instantaneously imparted to the fracturing part of the large end section 13, the large end section 38 can have a good-quality fractured surface. Further, because the free piston 38 and the piston 31 are accommodated in the bottomed cylinder 32, collision sound produced by the collision of the free piston 38 against the piston 31 can be effectively blocked by the bottomed cylinder, and thus, it is possible to prevent the collision sound from deteriorating the working environment.

Because the hydraulic piston can provide thrust force far greater than that provided by the air piston, this modification can avoid crack damages of the conrod and thus can perform reliable fracture splitting. Thus, the modification is suited for fracturing high-rigidity workpieces.

Whereas the foregoing have illustratively described the connecting-rod fracture splitting apparatus including the actuator having the first to fourth ports and the connecting-rod fracture splitting apparatus including the actuator having the A to C ports, the present invention is not limited to the above-described preferred embodiment and modification as along as it is constructed to drive the free piston to collide against the piston. Further, the pressure fluid for use in the present invention may be gas or water rather than the above-mentioned compressed air or pressure oil.

The connecting-rod fracture splitting apparatus of the present invention is well suited for application to splitting of large end sections of conrods.

What is claimed is:

1. A connecting-rod fracture splitting apparatus which includes two divided mandrel members for being inserted into a hole of a large end section of a connecting rod, a wedge for being driven into between the divided mandrel members, and an actuator advancing the wedge to move the divided mandrel members away from each other, and which splits the connecting rod by fracturing the large end section of the connecting rod, the actuator comprising: a bottomed cylinder having a piston accommodated therein; a piston rod connected to the piston and having one end portion extending out of the cylinder through a lid, the lid closing an opening of the cylinder, and connected directly or indirectly to the wedge; and a free piston slidably mounted on the piston rod and abuttable against an upper surface of the piston, wherein, by pressure fluid being supplied by a pressure fluid source to exert force on the upper surface of the piston, the free piston is positioned upward of the piston while imparting a preload to the hole of the large end section, and wherein, by pressure fluid being supplied by the pressure fluid source to exert force on a region upward of the free piston, the free piston is driven downward to collide against the upper surface of the piston, so that the divided mandrel members are moved apart from each other, via the piston rod and the wedge, to fracture the large end section of the connecting rod.

2. The connecting-rod fracture splitting apparatus according to claim 1, wherein the actuator includes a partition wall fixed to the cylinder between the piston and the lid and has a hole greater in diameter than the piston, wherein the free piston includes a flange portion which has an outer peripheral surface slidingly contacting a peripheral edge surface of the hole of the partition wall and an inner peripheral surface slidingly contacting the piston rod, the actuator further has: a first port provided in a bottom of the cylinder; a second port provided in a wall portion of the cylinder between the partition wall and the bottom; a third port provided in the wall portion of the cylinder between the partition wall and the lid; and a fourth port provided in the lid to extend toward the flange portion of the free piston; and a control section, the control section controls a control valve to supply pressure fluid into the actuator through the fourth port and thereby drives the free piston to collide against the piston.

3. The connecting-rod fracture splitting apparatus according to claim 1, wherein the free piston has an outer peripheral surface slidingly contacting the cylinder and has an inner peripheral surface slidingly contacting the piston rod, the actuator further has: an A port provided in a bottom of the cylinder; a B port provided in a wall portion of the cylinder between the piston and the free piston; a C port provided in the lid; and a control section, and the control section controls a control valve to supply pressure fluid into the actuator through the C port and thereby drives the free piston to collide against the piston.

* * * * *